US012231836B2

(12) United States Patent
Banh et al.

(10) Patent No.: US 12,231,836 B2
(45) Date of Patent: Feb. 18, 2025

(54) MICROPHONE PORT FOR ELECTRONIC DEVICES

(71) Applicant: Apple Inc., Cupertino, CA (US)

(72) Inventors: Megan L. Banh, San Francisco, CA (US); William C. Lukens, San Francisco, CA (US)

(73) Assignee: APPLE INC., Cupertino, CA (US)

(*) Notice: Subject to any disclaimer, the term of this patent is extended or adjusted under 35 U.S.C. 154(b) by 150 days.

(21) Appl. No.: 18/066,123

(22) Filed: Dec. 14, 2022

(65) Prior Publication Data

US 2024/0073573 A1 Feb. 29, 2024

Related U.S. Application Data

(60) Provisional application No. 63/373,666, filed on Aug. 26, 2022.

(51) Int. Cl.

*H04R 1/08* (2006.01)
*H04R 1/02* (2006.01)
*H04R 1/04* (2006.01)

(52) U.S. Cl.

CPC ............ *H04R 1/086* (2013.01); *H04R 1/028* (2013.01); *H04R 1/04* (2013.01); *H04R 2499/15* (2013.01)

(58) Field of Classification Search

CPC .......... H04R 1/086; H04R 1/028; H04R 1/04; H04R 2499/15

See application file for complete search history.

(56) References Cited

U.S. PATENT DOCUMENTS

| | | | | | |
|---|---|---|---|---|---|
| 4,920,564 | A * | 4/1990 | Allkins | H04M 1/03 | 381/189 |
| 6,188,773 | B1 * | 2/2001 | Murata | H04R 1/44 | 381/361 |
| 8,873,783 | B2 * | 10/2014 | Koester | H04R 25/60 | 381/189 |
| 9,363,589 | B2 * | 6/2016 | Lippert | H04R 1/086 | |
| 10,765,019 | B2 * | 9/2020 | Werner | G06F 1/163 | |
| 2004/0029530 | A1 * | 2/2004 | Noguchi | H04R 5/023 | 455/23 |
| 2006/0180153 | A1 * | 8/2006 | Schaub | A62B 18/08 | 128/206.16 |
| 2011/0013799 | A1 * | 1/2011 | Fang | H04R 1/086 | 381/355 |
| 2013/0223656 | A1 * | 8/2013 | Iuchi | H04R 1/086 | 381/189 |
| 2014/0044297 | A1 * | 2/2014 | Loeppert | H04R 1/086 | 381/355 |
| 2015/0273524 | A1 * | 10/2015 | Ely | H04R 19/005 | 310/322 |
| 2016/0378142 | A1 * | 12/2016 | Cardinali | H04R 1/00 | 361/679.56 |
| 2018/0070164 | A1 * | 3/2018 | Bruss | H01H 13/50 | |
| 2020/0146944 | A1 * | 5/2020 | Moulton | A61F 13/0203 | |
| 2021/0014598 | A1 * | 1/2021 | Pine | H04R 1/1041 | |
| 2022/0150651 | A1 * | 5/2022 | Tiefenau | H04R 25/654 | |

* cited by examiner

*Primary Examiner* — Oyesola C Ojo
(74) *Attorney, Agent, or Firm* — Dorsey & Whitney LLP

(57) ABSTRACT

An electronic device can include a housing including a sidewall having an interior surface defining a first aperture and an internal volume. The device can also include a microphone port disposed in the internal volume. The microphone port can include a structure having a cylindrical sidewall and a shelf extending radially inward from the cylindrical sidewall. The microphone port can also include a mesh fixed to the shelf.

19 Claims, 7 Drawing Sheets

MICROPHONE PORT FOR ELECTRONIC DEVICES

CROSS-REFERENCE TO RELATED APPLICATION(S)

This claims priority to U.S. Provisional Patent Application No. 63/373,666, filed 26 Aug. 2022, and entitled "MICROPHONE PORT FOR ELECTRONIC DEVICES," the entire disclosure of which is hereby incorporated by reference.

FIELD

The examples described in the present disclosure relate generally to electronic device ports. More particularly, the examples of the present disclosure relate to microphone ports.

BACKGROUND

Many electronic devices include internal components that interact in some way with the external environment through apertures in the outer housing of the device. For example, environmental sensors, antennas, and other components can send and receive signals through housing apertures. Speakers can also move air and pressure waves through the apertures to create sound. Similarly, microphones inside devices can receive audio waves through apertures to detect sound. However, unwanted particles and other pollutants from the external environment, which may enter into the internal volume of the device through the apertures, can interfere with the proper functioning of the internal components. In addition, some electronic components discussed above, which may be positioned adjacent to the aperture, can be unsightly.

Therefore, what is needed are ports and port assemblies that protect the internal components of the device from damage while preserving the aesthetically pleasing appearance of the device as viewed externally by a user.

SUMMARY

In at least one example of the present disclosure, an electronic device can include a housing including a sidewall having an interior surface defining a first aperture and an internal volume. The device can also include a microphone port disposed in the internal volume. The microphone port can include a support structure having a cylindrical sidewall and a shelf extending radially inward from the cylindrical sidewall. The microphone port can also include a mesh fixed to the shelf.

In one example, a diameter of the mesh is less than an inner diameter of the cylindrical wall. In one example, a diameter of the second aperture is less than the diameter of the mesh. In one example, the microphone port further includes an adhesive disposed between the mesh and the shelf, the adhesive fixing the mesh to the shelf. In one example, the adhesive includes a heat-activated film (HAF) adhesive. In one example, the device further includes a microphone and the microphone port further includes a foam layer disposed between the microphone and the shelf, the shelf disposed between the foam layer and the housing. In one example, the microphone port further includes a seal extending radially around the cylindrical wall between the support structure and the housing. In one example, the mesh is visible through the first aperture and the housing obstructs a view of the cylindrical wall.

In at least one example of the present disclosure, a microphone assembly can include a support structure and a microphone. The support structure can include a cylindrical sidewall having an inner diameter and a shelf extending radially inward from the cylindrical wall, the shelf defining an aperture having a diameter less than the inner diameter of the cylindrical wall. The microphone assembly can also include a mesh extending across the aperture, and an adhesive disposed between the shelf and the mesh, the adhesive fixing the mesh to the shelf. The microphone can be aligned with the aperture, with the shelf being disposed between the microphone and the mesh.

In one example, the adhesive can include an HAF adhesive. In one example, the mesh can include stainless steel. In one example, a diameter of the mesh is less than or equal to the inner diameter of the cylindrical wall. In one example, a diameter of the aperture is less than the diameter of the mesh. In another example, the microphone assembly can further include a foam ring disposed between the microphone and the shelf.

In at least one example of the present disclosure, an audio port can include a wall defining an outer cylindrical surface and an inner cylindrical surface having an inner diameter, a shelf extending radially inward from the inner cylindrical surface, the shelf defining an aperture, a mesh fixed to the shelf via an adhesive, the mesh extending across the aperture and having a diameter less than or equal to the inner diameter of the inner cylindrical surface, and adhesive disposed between the shelf and the mesh, the adhesive fixing the mesh to the shelf, and a seal disposed against and around the outer surface of the wall.

In one example, the adhesive includes a non-woven material. In one example, the mesh includes a first side and a second side, the adhesive fixing the second side to the shelf and the first side being free of affixation. In one example, the mesh is a first mesh, the adhesive layer is a first adhesive layer, and the audio port further includes a second mesh adhered to the first mesh via a second adhesive layer. In one example, the first mesh includes a first material and the second mesh includes a second material different than the first material. In one example, the mesh is a woven mesh.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1A:
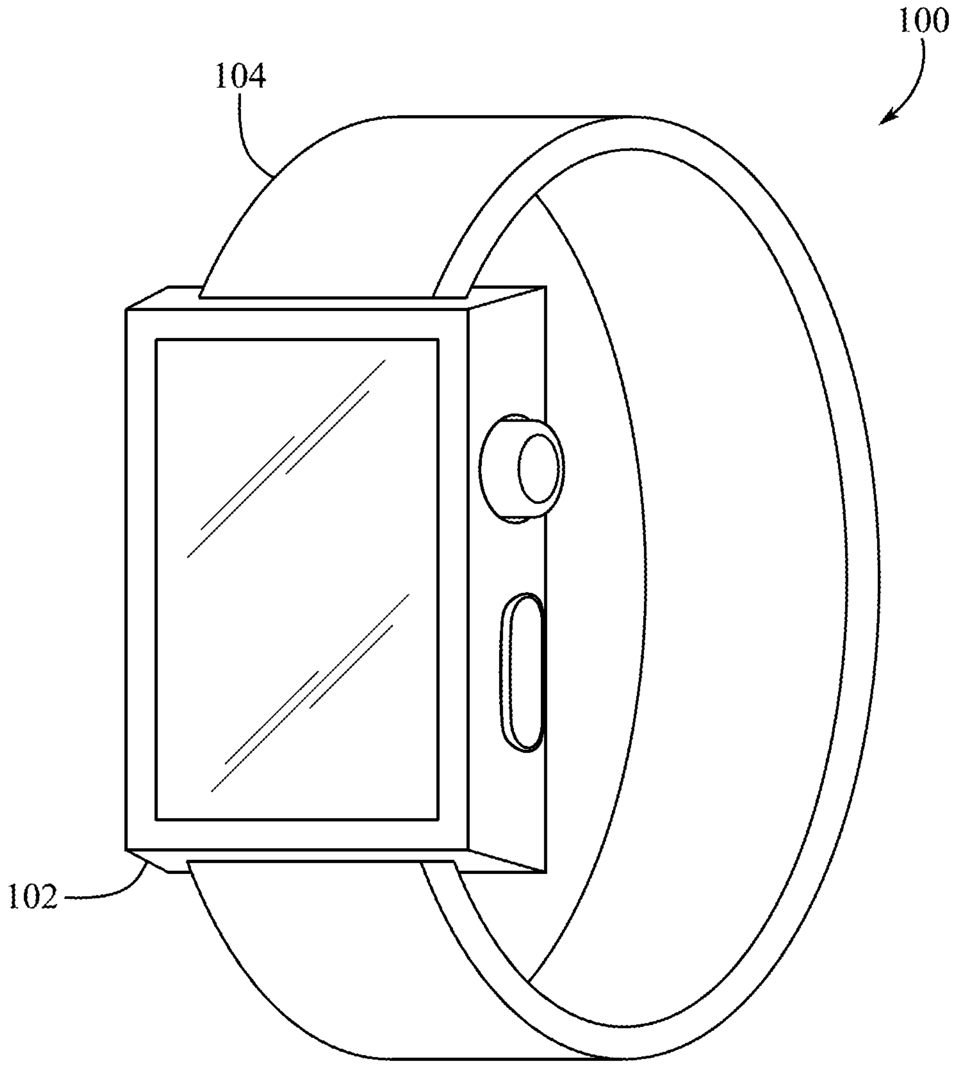
FIG. 1A shows a perspective view of an example of an electronic device.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

Audio ports and microphone assemblies described herein, which can include audio meshes and surrounding structures disposed within an internal volume of an electronic device, provide protection to the audio components while being aesthetically pleasing to the user as viewed externally through an aperture or opening in the device housing. The structures and components associated with the audio port can be hidden from view through the aperture such that only an aesthetically pleasing mesh is visible.

In one example, an electronic device can include a housing including a sidewall having an interior surface defining a first aperture and an internal volume. The device can also include a microphone assembly disposed in the internal volume. The microphone port can include a support structure having a cylindrical sidewall and a shelf extending radially inward from the cylindrical sidewall. The microphone port can also include a mesh fixed to the shelf. The mesh can be fixed to the shelf via an adhesive, such as a heat-activated film (HAF) adhesive. The mesh can extend over an aperture defined by the shelf.

An aperture defined by the cylindrical wall of the support structure can be greater than a diameter of the mesh fixed to the shelf and the microphone port can also include a seal disposed around and against and exterior surface of the cylindrical wall. The seal and/or the cylindrical wall can be positioned against an interior surface of a device housing surrounding an aperture of that device. The diameter of the aperture defined by the cylindrical wall can be larger than the diameter of the aperture in the housing. In this way, the microphone port, including the support structure and cylindrical sidewall thereof, are hidden from view by the housing.

The mesh can include materials and features that are more aesthetically pleasing to the user than the microphone underneath or any other component of the port, including the cylindrical sidewall of the support structure. Accordingly, when the user peers through the aperture of the hosing of the device, only the aesthetically pleasing mesh is visible.

These and other embodiments are discussed below with reference to FIGS. 1-6B. However, those skilled in the art will readily appreciate that the detailed description given herein with respect to these Figures is for explanatory purposes only and should not be construed as limiting. Furthermore, as used herein, a system, a method, an article, a component, a feature, or a sub-feature including at least one of a first option, a second option, or a third option should be understood as referring to a system, a method, an article, a component, a feature, or a sub-feature that can include one of each listed option (e.g., only one of the first option, only one of the second option, or only one of the third option), multiple of a single listed option (e.g., two or more of the first option), two options simultaneously (e.g., one of the first option and one of the second option), or combination thereof (e.g., two of the first option and one of the second option).

FIG. 1A shows an example of an electronic device 100. The electronic device shown in FIG. 1A is a watch, such as a smartwatch. The smartwatch of FIG. 1A is merely one representative example of a device that can be used in conjunction with the systems and methods disclosed herein. Electronic device 100 can correspond to any form of wearable electronic device, a portable media player, a media storage device, a portable digital assistant ("PDA"), a tablet computer, a computer, a mobile communication device, a GPS unit, a remote control device, or other electronic device. The electronic device 100 can be referred to as an electronic device, or a consumer device. In some examples, the electronic device 100 can include a housing 102 that can carry operational components, for example, in an internal volume at least partially defined by the housing. The electronic device 100 can also include a strap 103, or other retaining component that can secured the device 100 to a body of a user as desired. Further details of the electronic device are provided below with reference to FIG. 1B.

Figure 1B:
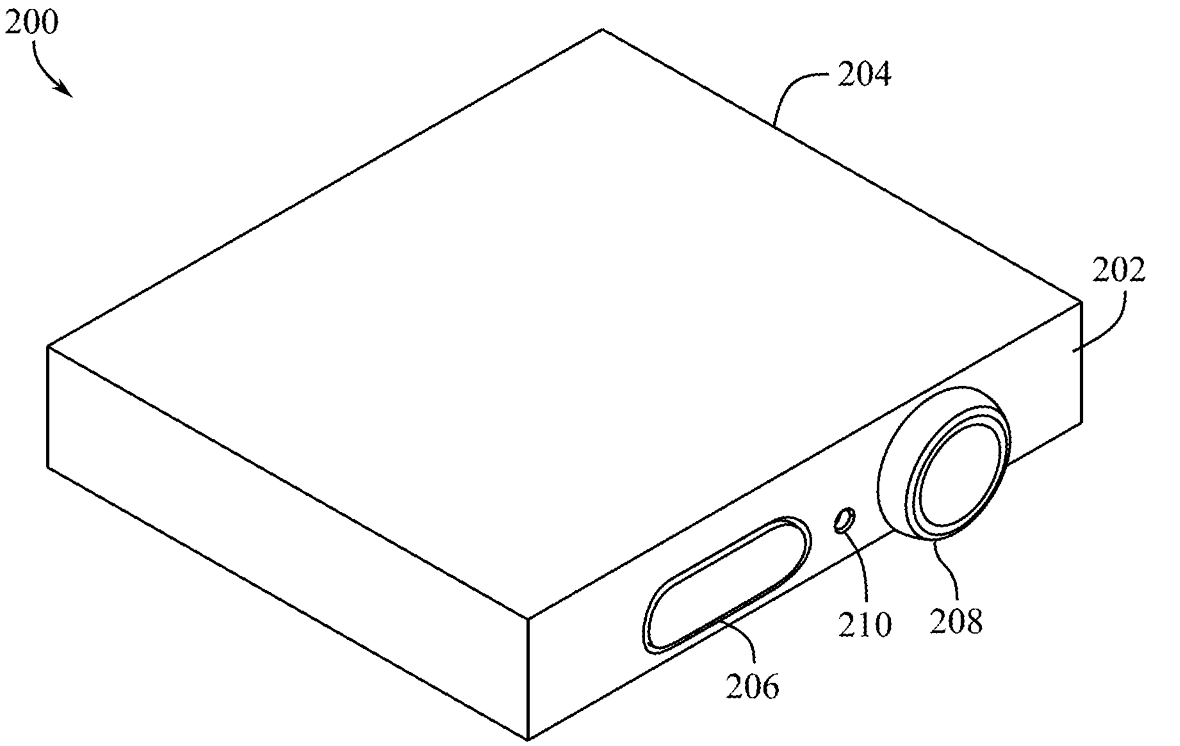
FIG. 1B shows a top perspective view of a portion thereof.

FIG. 1B illustrates a smartwatch device 200 that can be substantially similar to, and can include some or all of the features of the devices described herein, such as electronic device 100. The device 200 can include a housing 202, and a display assembly 204 attached to the housing. The housing 202 can substantially define at least a portion of an external surface of the device 200.

The display assembly 204 can include a glass, a plastic, or any other substantially transparent external layer, material, component, or assembly. The display assembly 204 can include multiple layers, with each layer providing a unique function, as described herein. Accordingly, the display assembly 204 can be, or can be a part of, an interface component. The display assembly 204 can define a front external surface of the device 200 and, as described herein, this external surface can be considered an interface surface. In some examples, the interface surface defined by display assembly 204 can receive inputs, such as touch inputs, from a user.

In some examples, the housing 202 can be a substantially continuous or unitary component and can define one or more openings to receive components of the electronic device 200. In some examples, the device 200 can include input components such as one or more buttons 206 and/or a crown 208 that can be disposed in the openings. In some examples, a material can be disposed between the buttons 206 and/or crown 208 and the housing 202 to provide an airtight and/or watertight seal at the locations of the openings. The housing 202 can also define one or more openings or apertures, such as aperture 210, which can also be referred to as a port 210, such as an audio port or microphone port, allowing for sound to pass into or out of the internal volume defined by the housing 202. For example, the port 210 can be in communication with a microphone component disposed in the internal volume. In some examples, the housing 202 can define or include a feature, such as an indentation to removably couple the housing 202 and a strap or retaining component.

Figure 1C:
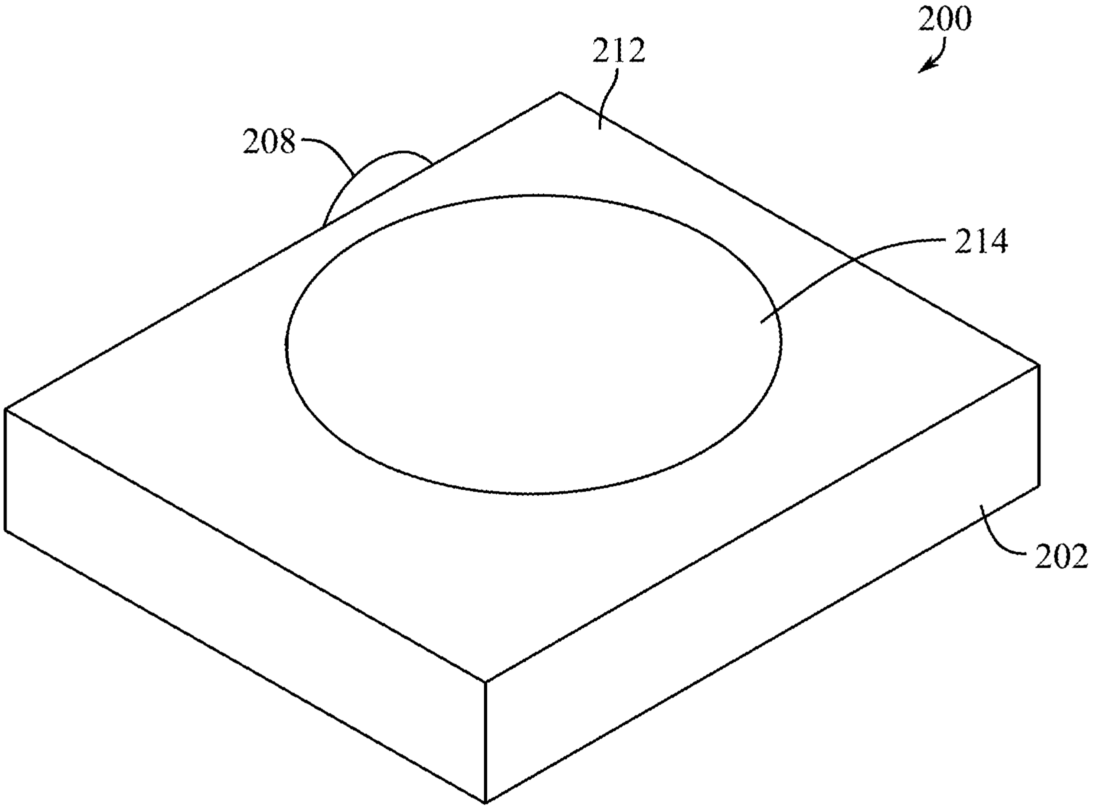
FIG. 1C shows a bottom perspective view thereof.

FIG. 1C shows a bottom perspective view of the electronic device 200. The device 200 can include a back cover 212 that can be attached to the housing 202, for example, opposite the display assembly 204. The back cover 212 can include ceramic, plastic, metal, or combinations thereof. In some examples, the back cover 212 can include an at least partially electromagnetically transparent component 214.

The electromagnetically transparent component 214 can be transparent to any desired wavelengths of electromagnetic radiation, such as visible light, infrared light, radio waves, or combinations thereof. In some examples, the electromagnetically transparent component 214 can allow sensors and/or emitters disposed in the housing 202 to communicate with the external environment. Together, the housing 202, display assembly 204 and back cover 212 can substantially define an internal volume and an external surface of the device 200.

Any of the features, components, and/or parts, including the arrangements and configurations thereof shown in FIGS. 1A-1C, can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIGS. 1A-1C.

Figure 2:
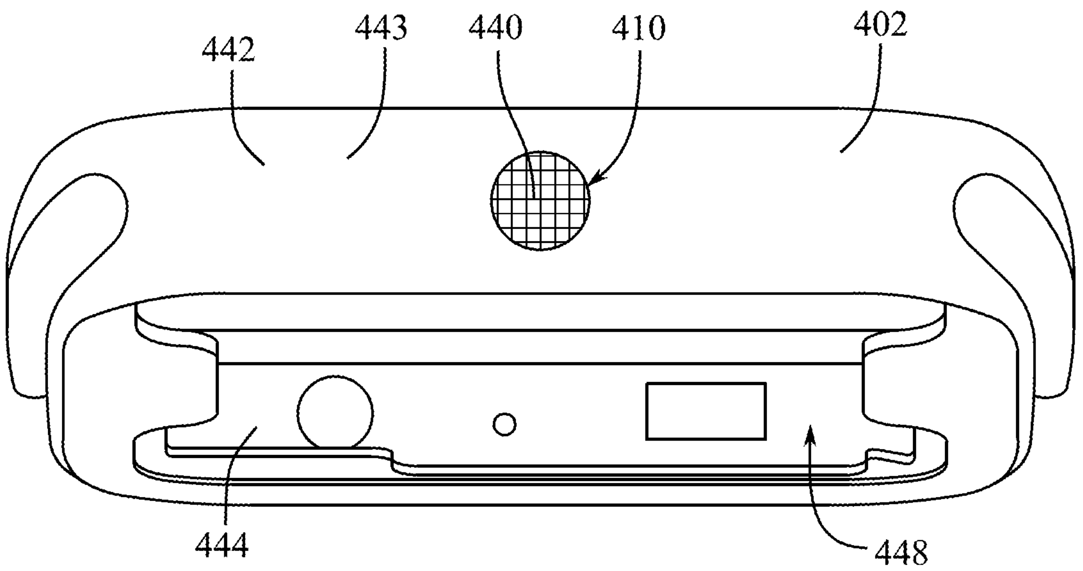
FIG. 2 shows a bottom perspective view of a housing of an example of an electronic device.

FIG. 2 illustrates an example of a housing 402 of an electronic device having a sidewall 443 defining an external surface 442, an interior surface 444, and an aperture or "port" 410. The housing 402 can also define an internal volume 448 of an electronic device. In order to prevent dirt, dust, water, or other debris such as salts from the external environment from entering into the internal volume 448 defined by the housing 402, a mesh 440 can be disposed over or across the port 410 as shown. The term "mesh," as used herein, can include a barrier or material portion that allows air to pass through but prevents or substantially prevents other debris, such as water, dirt, and dust, from passing through to the internal volume of the device. In one example, the mesh 440 can include multiple materials or layers formed, molded, adhered, or otherwise secured together via mechanical securement, to form a single mesh that extends across and/or occludes the port 410.

In some examples, the mesh 440 can include woven fabrics. In some examples, the mesh 440 can include woven metals or other filaments and fibers. In some examples, the mesh 440 can include porous, non-woven materials. Non-woven materials such as single pieces of porous materials can provide design advantages including a wide range of colors and appearances, which are easy and cheap to manufacture. In some examples, the mesh 440 can include natural and/or synthetic materials woven together. In some examples, the mesh 440 can include perforated materials including perforated metals, plastics, rubbers, other polymers, and so forth. These materials of the mesh 440, including any combination thereof, can prevent debris from entering into the internal volume 448 as well as present an aesthetically pleasing cover over otherwise less aesthetically pleasing electronic components or other features inside the internal volume 448 of the housing.

Any of the features, components, and/or parts, including the arrangements and configurations thereof shown in FIG. 2 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 2.

Figure 3:
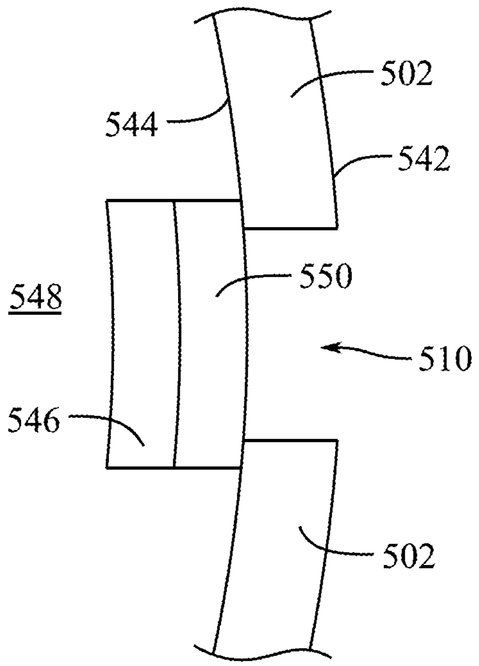
FIG. 3 shows a partial cross-sectional view of a housing of an electronic device and an example of a port disposed in an internal volume thereof.

FIG. 3 illustrates a cutout cross-sectional view of a housing 502 similar to the housing 402 shown in FIG. 2. In the illustrative example, the housing 502 includes an outer surface 542 and an interior surface 544. The housing 402 defines an port 510 across which or within which a mesh is disposed. In the illustrated example of FIG. 3, the mesh can be a part of a port or port assembly 550. In at least one example, the port 550 can include one or more components contacting the interior surface 544 of the housing 502 around the port 510.

The housing 502 can define an internal volume 548 of an electronic device. In addition, in at least one example, an electronic component 546 can be positioned within the internal volume 548 and adjacent to the port 550. In at least one example, the electronic component 546 is positioned directly against the port 550. However, in one or more other examples, the electronic component 546 can be separated by a distance from the port 550 and disposed within the internal volume 548. In at least one example, the electronic component 546 can include a microphone or a speaker. In examples where the electronic component 546 includes a microphone or speaker, the port 550 can be referred to as an audio port or microphone assembly 550.

In at least one example, the electronic component 546 can include a sensor. In one or more other examples, the electronic component 546 can include one or more other components of an electronic device that communicates or otherwise functions as an interface between the internal volume 548 of the electronic device and an external environment through the port 510. In at least one example, the port 550 can include two or more components functioning together or formed together to form a single port assembly or port module. As noted above, the port 550 can extend across or within the port 510 defined by the housing 502 to prevent or reduce the ingress of particles, liquid, or other undesirable pollutants from entering through the port 510 and into the internal volume 548. In one example, such particles, liquids, or other pollutants that may otherwise travel through the aperture 518 can negatively impact the functionality and performance of the electronic component 546, whether the electronic component is a sensor, microphone, speakers, or the like. In addition, as noted above, the port 550 can include aesthetically pleasing features to hide an external view of the electronic component 546 through the port 510.

Any of the features, components, and/or parts, including the arrangements and configurations thereof shown in FIG. 3 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 3.

Figure 4:
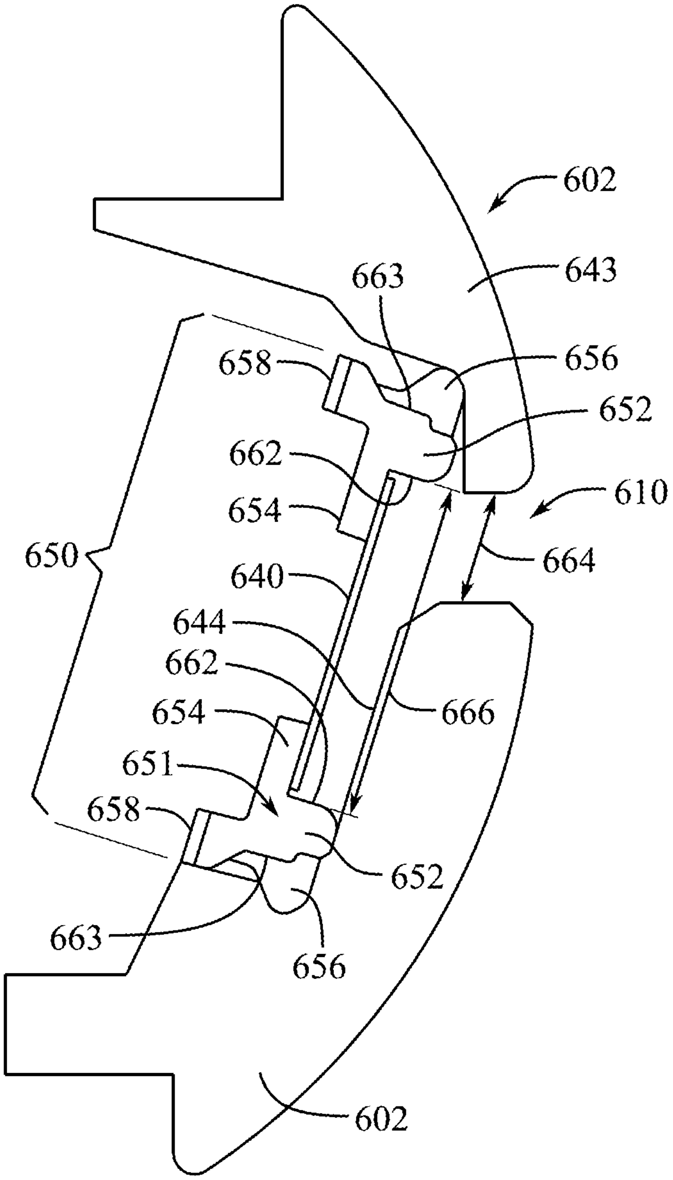
FIG. 4 shows a partial cross-sectional view of a housing of an electronic device and an example of a port disposed in an internal volume thereof.

FIG. 4 illustrates another example of a port 650 positioned against an interior surface 644 of a sidewall 643 of a housing 602 of an electronic device. In at least one example, the sidewall 643 defines an port 610 to allow sound waves in and out to be received or sent through the port 650 from a microphone or speaker, respectively, inside the device. In at least one example, the port 650 is contacting the interior surface 646 of the housing 602 around the port 610. In particular, in at least one example, the port 650 can include a microphone support structure 651, which can be referred to herein as a "snout" 651. The support structure 651 can include a first end configured to mechanically interface with a microphone within the device to provide structural support and positioning within the device. A second end of the support structure 651 opposite the first end can be configured to interface with the housing 602 at or around the port 610. In one example, the support structure 651 includes a turret-like feature at the second end including a cylindrical wall 652 defining an aperture through the support structure 651, with the cylindrical wall of the turret extending toward the interior surface 644 of the housing 602.

The support structure 651 can include a cylindrical wall 652 disposed adjacent the interior surface 644 around the port 610. In at least one example, the support structure 651 includes a seal 656 extending radially around the cylindrical wall 652 between the support structure 651 and the housing 602. In at least one example, the seal 656 can be disposed against and around an exterior surface 663 of the cylindrical wall 652 of the support structure 651. The seal 656 can include a rubber O-ring. The seal 656 can include elastic or otherwise compressible material that when pressed between the support structure 651 and the housing 602 forms a fluid-tight seal there between. The support structure 651 can also include a radial protrusion 654 extending radially inward from the cylindrical wall 652. The radial protrusion can also be referred to herein as a "shelf" 654. Also, in at least one example, the port 650 can be positioned with the internal volume of a device such that the housing 602 obstructs a view of the cylindrical wall 652 from outside the housing 602.

The port 650 can also include a mesh 640 fixed to the shelf 654 and a foam layer or ring 658 disposed against the support structure 651 In at least one example, the cylindrical wall 652 can include an inner surface 662 defining an inner diameter 666 of the cylindrical wall 652. The port 610 defined by the sidewall 643 of the housing 602 can include an inner diameter 664 less than the inner diameter 666 of the cylindrical wall 652 such that the cylindrical wall 652 and the support structure 651 in general are hidden from view by the housing 602 when looking through the port 610.

Any of the features, components, and/or parts, including the arrangements and configurations thereof shown in FIG. 3 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 4.

Figure 5A:
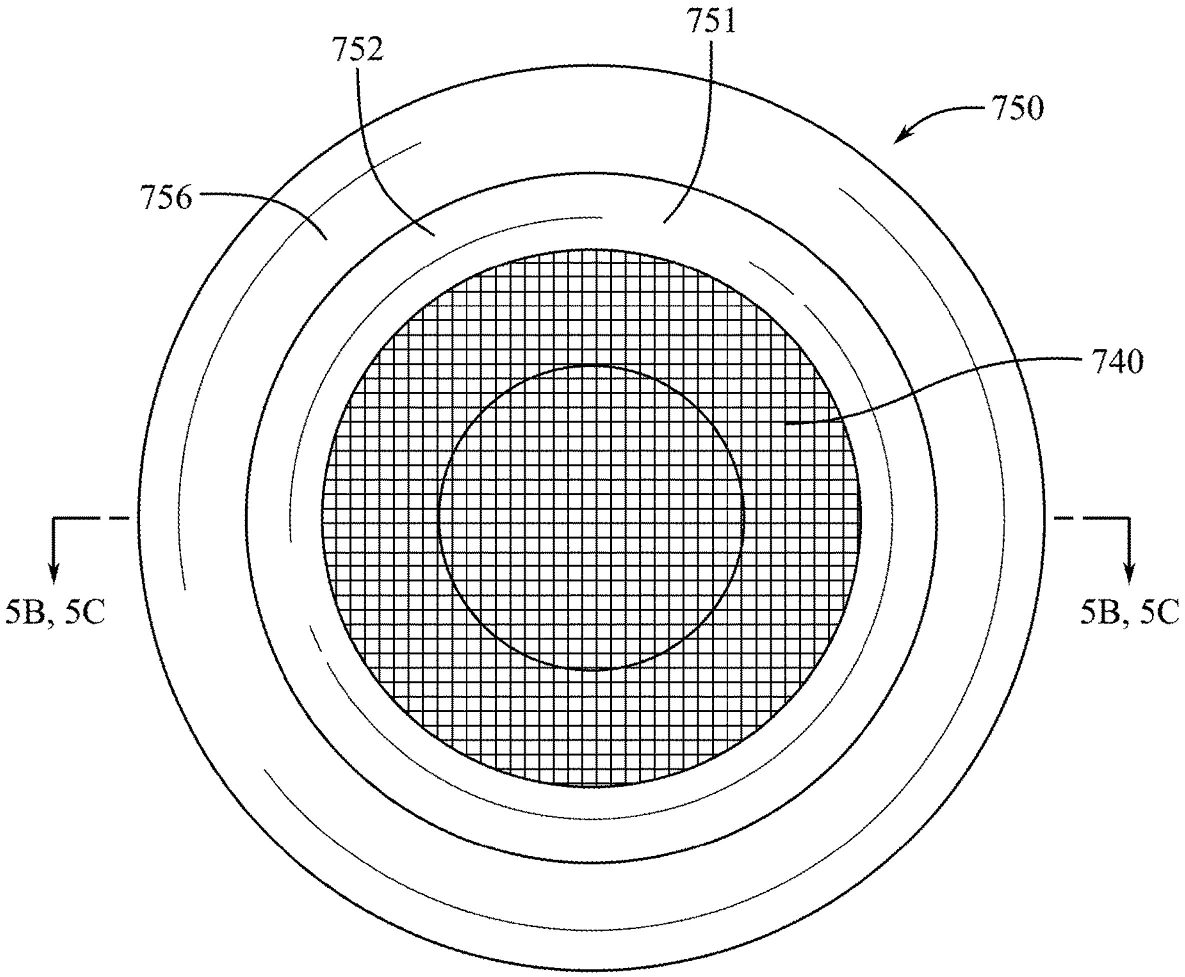
FIG. 5A shows a top plan view of an example of an audio port.
Figure 5B:
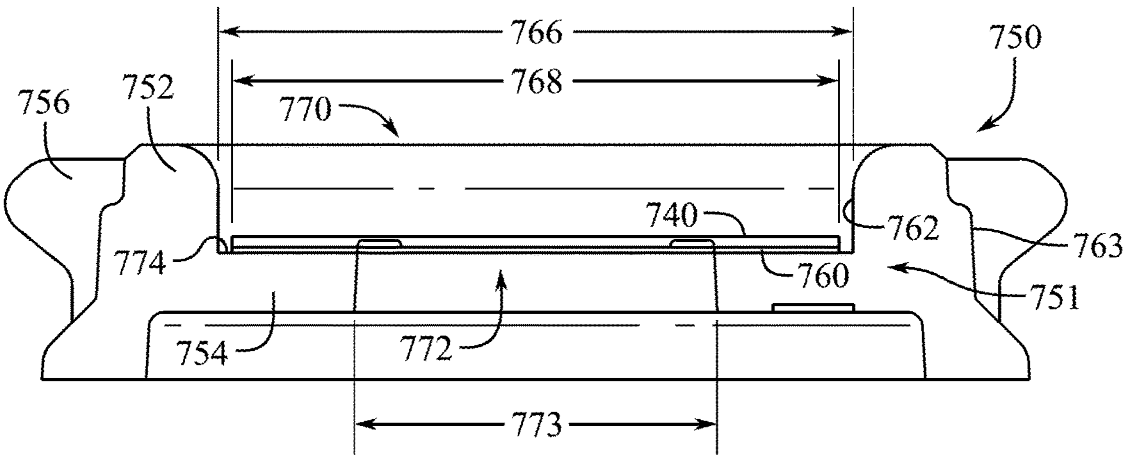
FIG. 5B shows a side cutaway view thereof.
Figure 5C:
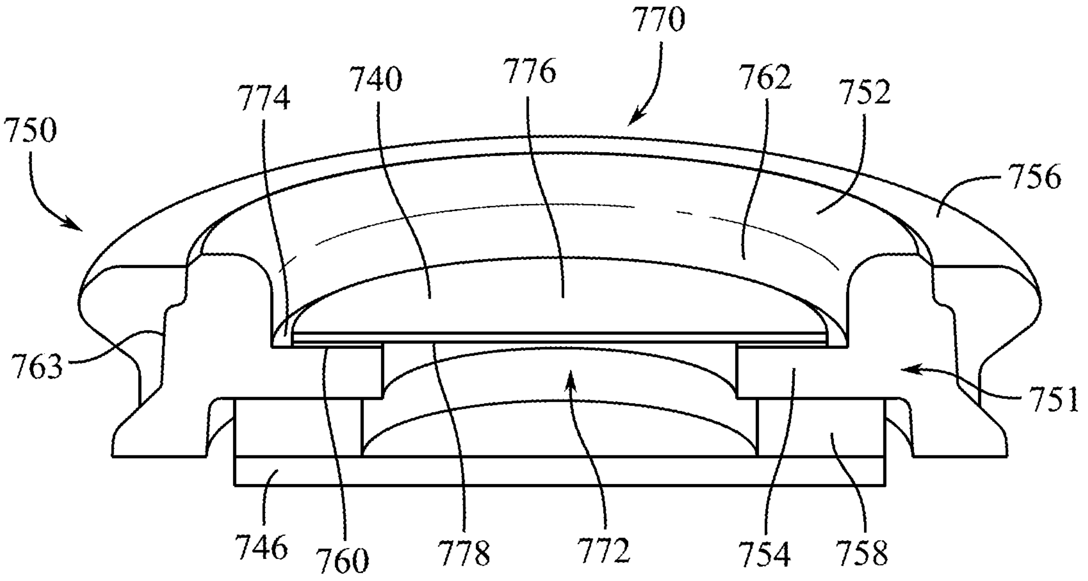
FIG. 5C shows a perspective cutaway view thereof.

FIGS. 5A, 5B, and 5C illustrate a top plan view, side cutaway view, and perspective cutaway view, respectively, of another example of a port 750. The top plan view of FIG. 5A illustrates the port 750 including the cylindrical wall 752 of the support structure 751 and a seal 756 extending radially around the cylindrical wall 752 and contacting the exterior surface 763 of the cylindrical wall 752. The side cutaway view of FIG. 5B also illustrates the port 750 including the cylindrical wall 752 of the support structure 751 and a seal 756 extending radially around the cylindrical wall 752. In at least one example, the cylindrical wall 752 includes an inner surface 762 defining an inner diameter 666 of the cylindrical wall 752. The inner surface 762 of the cylindrical wall 752 can also define a support structure aperture 770.

In at least one example, the support structure 751 includes a shelf 754 extending radially inward from the cylindrical wall 752. The shelf 754 can define a shelf aperture 772 and an upper shelf surface 774. A mesh 740 can be fixed to the shelf 754. In particular, the mesh 740 can be fixed to the upper shelf surface 774 via an adhesive 760. The adhesive 760 can be a ring disposed on the upper shelf surface 774 between the mesh 740 and the shelf 754. In at least one example, the adhesive can include an HAF adhesive. During manufacturing or assembly of the port 750, the HAF adhesive 760 can be placed onto the shelf 754 and then the mesh 740 can be placed on top of the HAF adhesive 760. Then, the HAF adhesive 760 can be heated to fix the mesh 740 to the upper shelf surface 774 of the shelf 754.

In at least one example, the inner surface 762 of the cylindrical wall 752 defines an inner diameter 766 of the cylindrical wall 752. The mesh 740 can also define a diameter 768, which can be less than or equal to the inner diameter 766 of the cylindrical wall 752. The shelf 754 can define a shelf aperture 772 having a diameter 773 less than the inner diameter 766 of the support structure aperture 770 such that the upper shelf surface 774 extends radially inward from the inner surface 762 of the cylindrical wall 752. The diameter of the shelf aperture 772 can be less than the diameter 768 the mesh 740 such that the mesh 740 can overlap and be fixed to the upper shelf surface 774 of the shelf 754.

FIG. 5C shows a perspective cutaway view of the port 750. The port 750 shown in FIG. 5C also illustrates a foam layer or foam ring 758 disposed between the shelf 754 and an electronic component 746. The electronic component can be a microphone or a portion of a microphone. The electronic component 746 shown in FIG. 5C can be referred to as a microphone 746. The microphone 746 and the support structure 751 can be positioned such that the foam ring 758 is held in compression after assembly. The foam ring 758 can protect sensitive components or areas of the microphone 743 as well as absorb variations in dimensions due to manufacturing tolerances associated with the formation of the port 750 and/or the microphone 746. The microphone can be aligned with the apertures 772, 770 of the port 750 as well as at least partially aligned with the aperture of the housing against which the port 750 is disposed. In at least one example, the foam layer or ring 758 is disposed between the microphone 746 and the shelf 754 and the shelf 754 is disposed between the foam layer or ring 7458 and the housing.

In at least one example, the mesh 740 can include or define a first side 776 and a second side 778 opposing the first side 776. The first side can be visible through an aperture in the device. The first side can also be free of affixation to any other component of the port 750 or the device in which the port 750 is disposed. The second side 778 can be fixed to the shelf 754 via the adhesive 760.

Any of the features, components, and/or parts, including the arrangements and configurations thereof shown in FIGS. 5A-5C, can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIGS. 5A-5C.

Figure 6A:
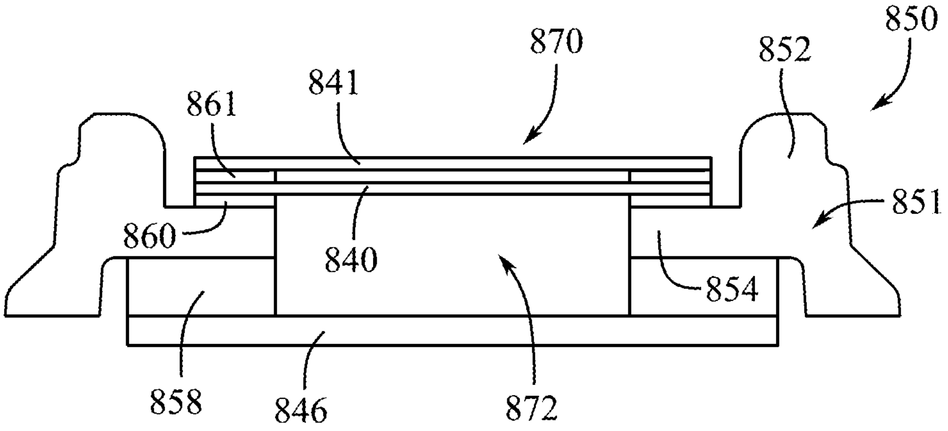
FIG. 6A shows a cross-sectional view of an example of an audio port.
Figure 6B:
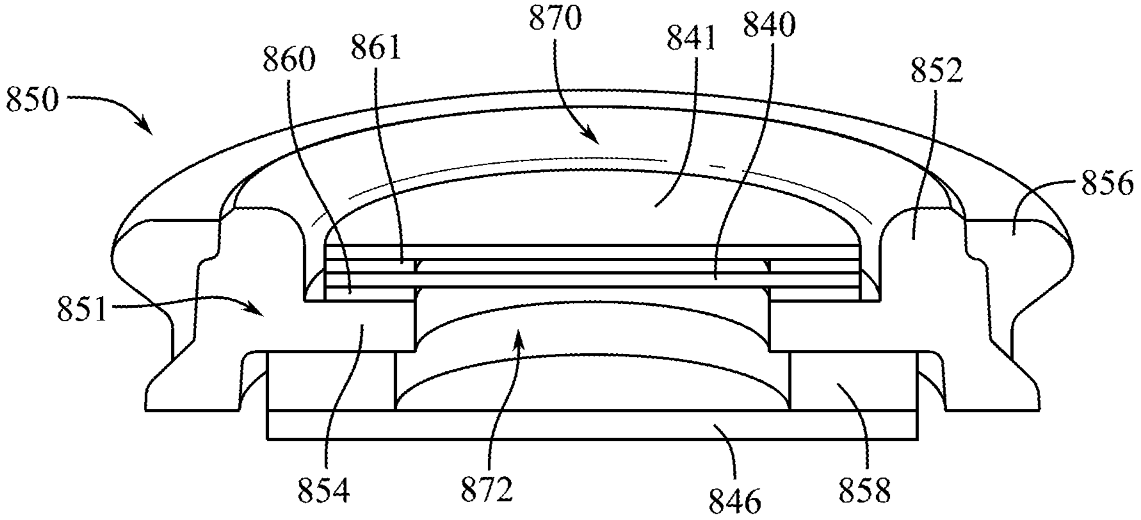
FIG. 6B shows a perspective cutaway view thereof.

FIGS. 6A and 6B illustrate a cross-sectional view and a cutaway view, respectively, of a port 850 including a support structure 851 having a cylindrical sidewall 852 and a shelf 854, similar to examples of ports shown in other figures. The cylindrical sidewall 852 defines a support structure aperture 870 and the shelf 854 defines a shelf aperture 872. The port 850 also includes a foam layer or ring 858 disposed against a lower side of the shelf 854. The port 850 of FIGS. 6A and 6B is shown with a microphone 846 disposed against the foam layer or ring 858. The port 850 also includes a first mesh 840 fixed to the shelf 854 via a first adhesive layer 860.

In addition, the example of the port 850 shown in FIGS. 6A and 6B include a second mesh 841 adhered to the first mesh 840 via a second adhesive layer 861. The two meshes 840, 841 can serve unique purposes, including the first mesh 840 providing structure and deflection boundaries to the second mesh 841 as the second mesh 841 deforms or deflects during use. In one example, the second mesh 841 can be an aesthetic mesh, being more pleasing to the eyes of a user, while the first mesh 840 is designed of cheaper materials or designed for microphone protection functionalities described elsewhere herein with reference to meshes shown in other figures. Accordingly, in at least one example, the first mesh 840 can include a first material and the second mesh 841 can include a second material different than the first material. The materials of each mesh 840, 841 can be selected to enable the unique functions of each mesh 840, 841 as described above.

Any of the features, components, and/or parts, including the arrangements and configurations thereof shown in FIGS. 6A-6B, can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIGS. 6A-6B.

To the extent applicable to the present technology, gathering and use of data available from various sources can be used to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, TWITTER® ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

What is claimed is:

1. An electronic device, comprising:
- a housing including:
  - a sidewall having an interior surface defining a first aperture and an internal volume; and
- a microphone assembly disposed in the internal volume, the microphone assembly comprising:
  - a cylindrical wall adjacent the interior surface of the housing around the first aperture; and
  - a radial protrusion extending inward from the cylindrical wall, the radial protrusion defining a second aperture;
  - a mesh fixed to the radial protrusion; and
  - a compressible ring defining a third aperture aligned with the second aperture, the compressible ring disposed against the radial protrusion, the radial protrusion disposed between the mesh and the compressible ring.

2. The electronic device of claim 1, wherein a diameter of the mesh is less than an inner diameter of the cylindrical wall.

3. The electronic device of claim 2, wherein a diameter of the second aperture is less than the diameter of the mesh.

4. The electronic device of claim 1, the microphone assembly further comprising an adhesive disposed between the mesh and the radial protrusion, the adhesive fixing the mesh to the radial protrusion.

5. The electronic device of claim 4, wherein the adhesive comprises a heat-activated film (HAF) adhesive.

6. The electronic device of claim 1, further comprising a microphone, the compressible ring comprising a foam layer disposed between the microphone and the radial protrusion, the radial protrusion disposed between the foam layer and the housing.

7. The electronic device of claim 1, further comprising a microphone port defined by the first aperture, the microphone port further comprising a seal extending radially around the cylindrical wall between the microphone assembly and the housing.

8. The electronic device of claim 1, wherein:
- the mesh is visible through the first aperture; and
- the housing obstructs a view of the cylindrical wall.

9. A microphone assembly, comprising:
- a support structure including:
  - a cylindrical wall having an inner diameter; and
  - a shelf extending radially inward from the cylindrical wall, the shelf defining a first aperture having a diameter less than the inner diameter of the cylindrical wall;
- a mesh extending across the first aperture;
- an adhesive disposed between the shelf and the mesh, the adhesive fixing the mesh to the shelf;
- a microphone aligned with the first aperture, the shelf disposed between the microphone and the mesh; and
- a foam ring disposed between the microphone and the shelf, the foam ring defining a second aperture aligned with the first aperture.

10. The microphone assembly of claim 9, wherein the adhesive comprises an HAF adhesive.

11. The microphone assembly of claim 10, wherein the mesh comprises stainless steel.

12. The microphone assembly of claim 9, wherein a diameter of the mesh is less than the inner diameter of the cylindrical wall.

13. The microphone assembly of claim 12, wherein a diameter of the first aperture is less than the diameter of the mesh.

14. A device, comprising:
- a housing defining a port; and
- an audio assembly abutting the port, the audio assembly comprising:
  - a wall defining an outer cylindrical surface and an inner cylindrical surface having an inner diameter;
  - a shelf extending radially inward from the inner cylindrical surface, the shelf defining a first aperture;
  - a mesh fixed to the shelf via an adhesive, the mesh extending across the first aperture and having a diameter less than or equal to the inner diameter of the inner cylindrical surface;
  - an adhesive layer disposed between the shelf and the mesh, the adhesive layer fixing the mesh to the shelf;
  - a seal disposed against and around the outer cylindrical surface of the wall; and
  - a compressible portion disposed against the shelf, the shelf disposed between the compressible portion and the mesh, the compressible portion defining a second aperture aligned with the first aperture.

15. The device of claim 14, wherein the mesh comprises a non-woven material.

16. The device of claim 14, wherein the mesh comprises a first side and a second side, the adhesive layer fixing the second side to the shelf, and the first side being free of affixation.

17. The device of claim 14, wherein:
- the mesh is a first mesh;
- the adhesive layer is a first adhesive layer; and
- the audio assembly further comprises a second mesh adhered to the first mesh via a second adhesive layer.

18. The device of claim 17, wherein:
- the first mesh comprises a first material; and
- the second mesh comprises a second material different than the first material.

19. The device of claim 14, wherein the mesh comprises a woven mesh.

* * * * *